United States Patent [19]

Futagawa

[11] Patent Number: 4,660,034
[45] Date of Patent: Apr. 21, 1987

[54] INFORMATION INPUT MACHINE

[76] Inventor: Toshinobu Futagawa, 3-3-23, Nishishinjuku, Shinjuku-ku, Tokyo, Japan

[21] Appl. No.: 677,178

[22] Filed: Dec. 3, 1984

[51] Int. Cl.⁴ .......................... H04Q 1/00; G08B 5/00
[52] U.S. Cl. ........................... 340/825.79; 340/815.08; 340/365 VL
[58] Field of Search .................. 340/825.79, 815.08, 340/815.09, 365 VL, 706, 712; 40/447, 471, 467, 519

[56] References Cited

U.S. PATENT DOCUMENTS 4,002,401  1/1977  Malberg ............................... 40/471
4,067,006  1/1978  Saylor et al. .................... 340/815.08

FOREIGN PATENT DOCUMENTS 56-29734  12/1983  Japan .
57-91759  12/1983  Japan .
57-85351  12/1983  Japan .
57-85352  12/1983  Japan .
57-85353  12/1983  Japan .
57-85354  12/1983  Japan .
57124877  2/1984  Japan .
57108603  2/1984  Japan .

Primary Examiner—Donald J. Yusko
Attorney, Agent, or Firm—Wolf, Greenfield & Sacks

[57] ABSTRACT

An input machine for inputting information corresponding to a desired item, comprising a plurality of guide plates arranged substantially parallel to each other and lying substantially on a single plane, a plurality of films on each of which a plurality of items to be inputted are printed and which are adapted to be shifted on the corresponding guide plates, and means for shifting the films simultaneously on the corresponding guide plates is disclosed.

15 Claims, 4 Drawing Figures

INFORMATION INPUT MACHINE

BACKGROUND OF THE INVENTION

The present invention relates to an input machine for inputting informations into associated apparatuses by selecting a desired item among a plurality of items printed on tapes or films and designating an address, which corresponds to the selected item, among a plurality of addresses stored in a memory in an input equipment, thereby generating an output signal regarding the information corresponding to the desired item. More particularly, the present invention relates to an item selecting apparatus used with such input machine and the like for driving films to quickly select and accurately position a desired item printed on the associated film in a predetermined position.

A conventional codeless input machine 4 (FIG. 1) comprises an input unit 1 and a film 2 on which a number of items 3 are printed in matrix pattern. Each item printed on the film corresponds to a respective information to be inputted. All of the items printed on the film are grouped into a plurality of pages 5 having a lengthwise dimension B equal to that of the input unit, a transverse dimension of each page corresponding to the width of the film. In order to position a desired item 3 on the input unit 1 for inputting the information corresponding to the desired item, film can be moved by means of an appropriate film feeding device (not shown) incorporated into the input machine in both directions indicated by an arrow A such that the page 5 including the desired item 3 is aligned with the input unit 1. When the desired item 3 is energized by a pen-touch or key-push operation, a corresponding input signal is generated; said input signal selecting or designating a corresponding address among a plurality of addresses stored in a memory (not shown) through the medium of a control portion (not shown) in the input unit 1, thereby generating an output signal regarding the information corresponding to the desired item. When a new item to be inputted next is not included in the present page, the film must be moved to position a new page including said new item on the input unit 1.

In this conventional input machine, since the movement of the film is effected per "page", when the lengthwise dimension of the page is B and the moving speed of the film is V, it takes at least a time of B/V for changing a page from one to the next one. Particularly, if the first page is changed to the last page, when the total number of pages is N, it takes a long time of B/V (N−1). Accordingly, this conventional input machine has a disadvantage of time consumption for changing pages with the result that efficiency of inputting operation is reduced.

By increasing the moving speed of the film, the above drawback of the conventional input machine can be more or less eliminated. However, in this case, there exists another drawback that it is difficult to accurately stop a desired page of the film in a predetermined position on the input unit.

SUMMARY OF THE INENTION

An object of the present invention is to provide an input machine for inputting a desired information corresponding to a desired item selected among a plurality of items printed on films, wherein the selection of the desired item can be effected quickly and accurately.

According to a principle of the present invention, a plurality of films each on which a plurality of columns of items are printed are used. Each film is guided and moved on a corresponding guide plate. Each guide plate has a length at least equal to a width of the corresponding film, and a width which can position one column of items printed on the corresponding film on said guide plate. The guide plates are arranged side by side substantially in a single plane. Accordingly, a plurality of columns of items (the number of the columns is equal to that of the guide plates) can be positioned or displayed on said single plane; all of the displayed items can constitute a "page" as mentioned above with respect to the prior art technique. In the present invention, the change of "page" from one to the next one can be easily effected by shifting all of the films simultaneously only by a distance equal to the width of the guide plate. Therefore, it is clear that a time for changing pages in the present invention is remarkably short in comparison with that of the above-mentioned prior art.

In a preferred embodiment of the present invention, the films are wound, from their one end, on corresponding rollers (first rollers) which are arranged side by side below the corresponding guide plates. Further, the films are wound together, from the other ends thereof, on a common roller (second roller) arranged parallel to the aforementioned first rollers. Thus, all of the films can be shifted in one direction by rotating the first rollers simultaneously and in the other direction by rotating the second roller.

DETAILED DESCRIPTION OF THE PREFERRED EMBODIMENTS

Figure 2A:
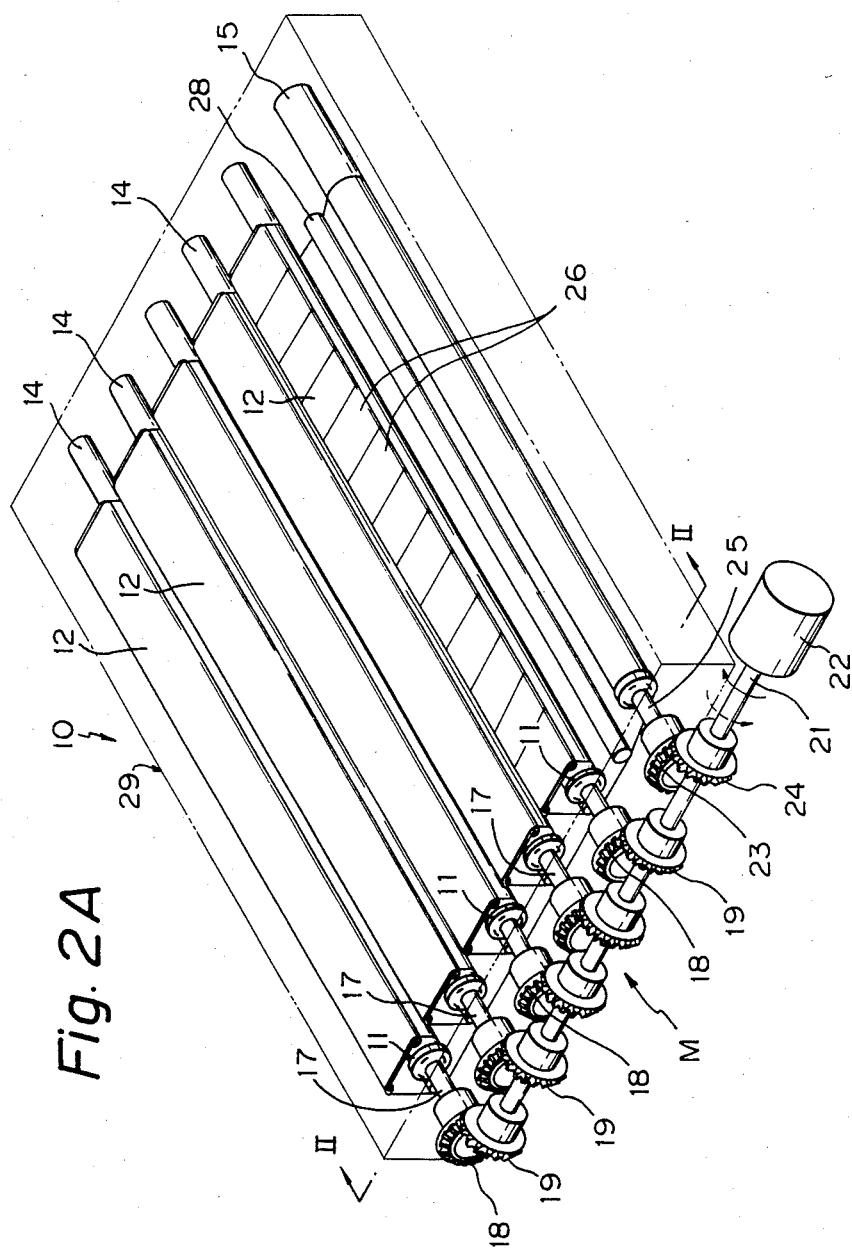
FIG. 2A is a partial perspective view of an input machine corresponding to a preferred embodiment of the present invention.
Figure 2B:
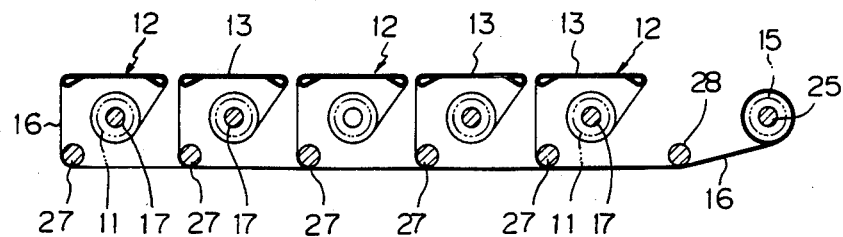
FIG. 2B is a sectional view taken along a line II—II of FIG. 2A, showing the relationship between films and corresponding rollers.

The present invention will now be described in detail with reference to the drawings showing embodiments of the input machine according to the present invention. As shown in FIGS. 2A and 2B, an input machine 10 according to the present invention comprises a plurality of first rollers 11 arranged side by side and parallel to each other and lying on a single plane, and a plurality of guide plates 12 each disposed above the corresponding first roller 11. The guide plates 12 are also arranged side by side and parallel to each other, upper surfaces 13 of the guide plates 12 lying in a single plane. The first rollers 11 are rotatably mounted on a fixed frame (not shown) of the input machine 10 in an appropriate known manner (not shown) by means of end shafts 14 of the rollers 11. The guide plates 12 are fixed to the fixed frame of the machine in an appropriate manner.

A second roller 15 is arranged parallel to the first rollers 11 and is rotatably mounted on the fixed frame of the machine in an appropriate known manner.

On each first roller 11, a corresponding film 16 is wound from its one end. The films 16 extend from the corresponding first rollers 11 to pass on the corresponding guide plates 12 and are wound together on the second roller 15 from the other ends thereof. Accordingly, when the second roller 15 is rotated in an anticlockwise direction (FIG. 2A), all of the films 16 are simultaneously unwound from the corresponding first rollers 11 by the same amount, while when all of the first rollers 11 are simultaneously rotated in a clockwise direction (FIG. 2A), all of the films 16 are simultaneously unwound from the second roller 15 by the same amount.

The input machine 10 according to the present invention includes a mechanism M for selectively rotating the first and second rollers 11 and 15. This mechanism comprises first bevel gears 18 each fixed to an end shaft 17 of the corresponding first roller 11 through an appropriate clutch (not shown), and second bevel gears 19 fixed to a driving shaft 21 connected to a reversible stepping motor 22, each second bevel gear 19 meshing with the corresponding first bevel gear 18 of the first roller 11. The mechanism M further includes a third bevel gear 23 fixed to an end shaft 25 of the second roller 15 through an appropriate clutch (not shown) and a fourth bevel gear 24 fixed to the driving shaft 21 of the motor 22 and engaged by the third bevel gear 23. By rotating the driving shaft 21 in a clockwise direction (shown by an arrow of a solid line in FIG. 2A) by means of the motor 22, all of the films 16 can be wound simultaneously on the corresponding first rollers 11 by the same amount; on the contrary, when the driving shaft 21 is rotated in an anticlockwise direction (shown by an arrow of a broken line) by means of the motor 22, all of the films 16 can be wound simultaneously on the second roller 15 by the same amount.

Each guide plate 12 has a length at least equal to a width of the film 16, and a width A' which can position one column of items 26 printed on the corresponding film 16 on said guide plate 12. Accordingly, normally, a plurality of columns of items 26 (the number of the columns is equal to the number of the guide plates) are displayed on the guide plates 12. In this connection, if the films 16 are simultaneously shifted by means of the motor 22 and the bevel gears 18, 19, 23 and 24 by a distance equal to the width A' of the guide page 12, the columns of the items displayed on the guide plates are changed to the next new columns of the items. Therefore, by selectively rotating the first and second rollers, a column of the items including a desired item can be easily positioned on the guide plate 12. Preferbly, in order to keep the films 16 in tension condition during the movement or shifting of the films, appropriate tension rollers 27 and 28 are provided in relation to the films 16.

The input machine 10 of the present invention is further provided with a conventional input unit 29 for inputting the information corresponding to the desired item. The input unit operates in a conventional manner. The operation of the input unit will be apparent from the explanation described later.

Figure 2C:
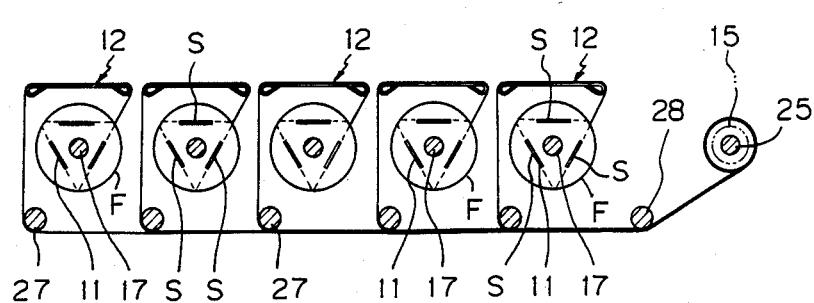
FIG. 2C is a sectional view similar to FIG. 2B, showing a modification of the rollers.

Although each first roller 11 of FIGS. 2A and 2B has a circular cross section as shown, the first rollers are not limited to such configuration. For example, each first roller 11 may have a polygonal cross section such as a triangular cross section as shown in FIG. 2C. In this case, since each outer surface S of the triangular first roller 11 can act as a supporting surface for the film 16 to be displayed in a single plane, the corresponding guide plate 12 can be omitted. In page changing operation, the triangular first rollers 11 of FIG. 2C are rotated by 120° by means of the motor 22 (FIG. 2A).

Preferably, circular end flanges F are fixed to both ends of each first roller to correctly guide the corresponding film.

As apparent from the explanation regarding the above embodiment, in the input machine according to the present invention, since all of the films can be simultaneously shifted quickly (and, more particularly, since the presently-displayed items on the machine can be changed by new items by shifting the films at least by a distance equal to the width A' of the guide plate), a desired new item can be easily and very quickly positioned on the corresponding guide plate.

Figure 1:
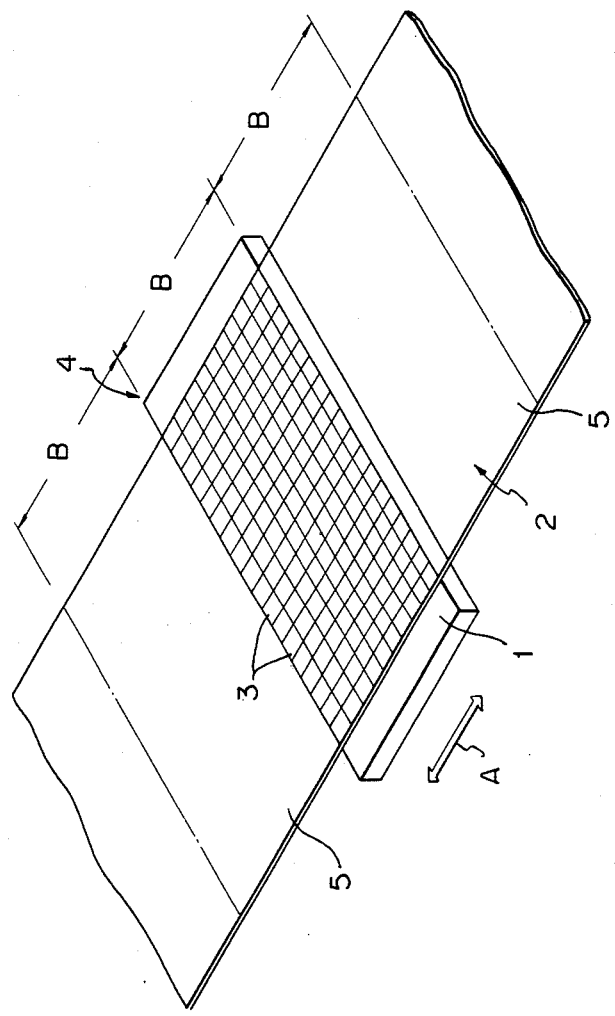
FIG. 1 is a partial perspective view of a conventional codeless input machine.

The operation of the input machine according to the present invention is substantially the same as that of the conventional input machine as described above with respect to FIG. 1, as far as an inputting operation. Briefly explained, with reference to the input machine of FIG. 2A, if a desired item is now not on the corresponding guide plate 12, by shifting all of the films 16 under the control of the stepping motor 22 up to a position where said desired item is positioned on the corresponding guide plate 12. Then, when the desired item is energized by a pen-touch, finger-touch or key-push operation, a corresponding input signal is generated in the input unit 29; said input signal designating a corresponding address among a plurality of addresses stored in a memory (not shown) through the medium of a control portion (not shown) in the input unit 29, thereby generating an output signal regarding the information corresponding to the desired item.

Although the present invention has been explained with reference to the illustrated embodiment, it should be noted that various modifications or variations can be effected by any skilled person in the art without deviating from the scope of the present invention. For example, in the embodiment of FIGS. 2A and 2B, when the rollers 11 on which the corresponding film 16 is wound have a polygonal cross section, such as in FIG. 2C, the corresponding guide plates 12 may be omitted.

This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An input machine for inputting information corresponding to a desired item printed on film to select desired data from a data base, said machine comprising, a plurality of planar support members arranged substantially parallel to each other and lying substantially in a single plane, a plurality of films on each of whcih the plurality of items to be inputted are printed and which are adapted to be shifted on the corresponding planar support members, means for shifting the films simultaneously on the corresponding support members, a plurality of first rollers, said each film being wound, from its one end, on a corresponding first roller, a second roller, all of said film being wound together, from the other ends thereof, on the second roller, and said means for shifting the films comprising means for selectively rotating all of the first rollers and second roller.

2. An input machine according to claim 1, characterized in that each of said first rollers has a polygonal cross-section.

3. An input machine for inputting information to an input unit and corresponding to a desired item printed on film to select desired data from a data base, said machine comprising;
- a plurality of film support means arranged substantially parallel to each other and lying substantially in a single plane,
- a plurality of films on said film support means each having disposed thereon a plurality of items to be inputted,
- manually selectable means disposed over the support means for the films for manual selection of an item to generate a corresponding input signal to said input unit denoting an address of the data base,
- and means for shifting the films simultaneously on the corresponding support means to bring other items on the films up for selection.

4. An input machine according to claim 3 wherein said support means comprises a plurality of guide plates arranged substantially parallel to each other.

5. An input machine according to claim 3 wherein said support means comprises a plurality of roller means.

6. An input machine according to claim 5 wherein said roller means comprises a polygonal shaped roller.

7. An input machine according to claim 3 wherein said support means comprises a plurality of first rollers, each film being wound, from its one end, on a corresponding first roller, and a second roller, all of said film being wound together, from the other ends thereof, on the second roller.

8. An input machine according to claim 7 wherein said means for shifting comprises means for mutually exclusively and selectively rotating all of the first rollers and the second roller.

9. An input machine according to claim 3 wherein said means having a plurality of stepping means having a plurality of position with each stepped position representative of a page of data.

10. An input machine according to claim 9 wherein said film support means comprises a plurality of guide plates arranged substantially parallel to each other, and a plurality of film support rollers disposed one under each said guide plate.

11. An input machine according to claim 10 including a second roller for commonly supporting one end of all films.

12. An input machine according to claim 3 wherein said manually selectable means comprises one of pen-selection means, finger-touch means, and key-push means.

13. An input machine according to claim 3 wherein said film support means comprises a plurality of guide plates with each film being guided and moved on a corresponding guide plate, each said guide plate having a length at least equal to the width of the corresponding film, and a width which positions one column of items printed on the corresponding film on said guide plate.

14. An input machine according to claim 13 wherein the guide plates are arranged side by side substantially in a single plane whereby a plurality of columns of items are positioned on said single plane, all of the so positioned items comprising a page.

15. An input machine according to claim 14 wherein said means for shifting comprises stepping means to move the film in stepped increments by a distance substantially equal to the width of the guide plate to change from one page of items to the next.

* * * * *